United States Patent
Saylor et al.

(10) Patent No.: US 9,378,386 B1
(45) Date of Patent: Jun. 28, 2016

(54) CONTENT SHARING TECHNOLOGY

(71) Applicant: MicroStrategy Incorporated, Vienna, VA (US)

(72) Inventors: Michael J. Saylor, Vienna, VA (US); Hector Vazquez, Ashburn, VA (US); Peng Xiao, McLean, VA (US)

(73) Assignee: MicroStrategy Incorporated, Vienna, VA (US)

(*) Notice: Subject to any disclaimer, the term of this patent is extended or adjusted under 35 U.S.C. 154(b) by 0 days.

(21) Appl. No.: 14/208,116

(22) Filed: Mar. 13, 2014

Related U.S. Application Data

(60) Provisional application No. 61/790,914, filed on Mar. 15, 2013.

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
CPC .................................................. G06F 21/6209
USPC .......................................................... 726/28
See application file for complete search history.

(56) References Cited

U.S. PATENT DOCUMENTS

| | | | |
|---|---|---|---|
| 8,234,220 B2 | 7/2012 | Weiss | |
| 8,613,052 B2 | 12/2013 | Weiss | |
| 2006/0009155 A1* | 1/2006 | Paalasmaa et al. | 455/41.2 |
| 2009/0100109 A1* | 4/2009 | Turski et al. | 707/200 |
| 2011/0138297 A1* | 6/2011 | Harper et al. | 715/743 |
| 2012/0050004 A1* | 3/2012 | Curtis et al. | 340/5.2 |
| 2012/0198559 A1* | 8/2012 | Venkata Naga Ravi | 726/26 |
| 2013/0080534 A1* | 3/2013 | Ogawa et al. | 709/204 |
| 2013/0166904 A1* | 6/2013 | Amaya Calvo et al. | 713/151 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

(Continued)

*Primary Examiner* — Mahfuzur Rahman
(74) *Attorney, Agent, or Firm* — Fish & Richardson P.C.

(57) ABSTRACT

In one implementation, a computer system receives a request from a first user to perform an operation related to a file stored by the computer system. The file is associated with a second user, and the second user has shared the file with the first user with one or more conditions on the usage of the file by the first user. Based on the first user requesting to perform the operation, the computer system evaluates whether the one or more conditions placed on the usage of the file by the first user allow the first user to perform the operation. Based on evaluation results, the computer system determines that the one or more conditions placed on the usage of the file by the first user allow the first user to perform the operation and authorizes performance of the operation.

21 Claims, 9 Drawing Sheets

(56) References Cited

OTHER PUBLICATIONS

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on Aug. 15, 2012]. Retrieved from the Internet: <URL: http://en.wikipedia.org/wiki/Two-factor_authentication>, 15 pages.

\* cited by examiner

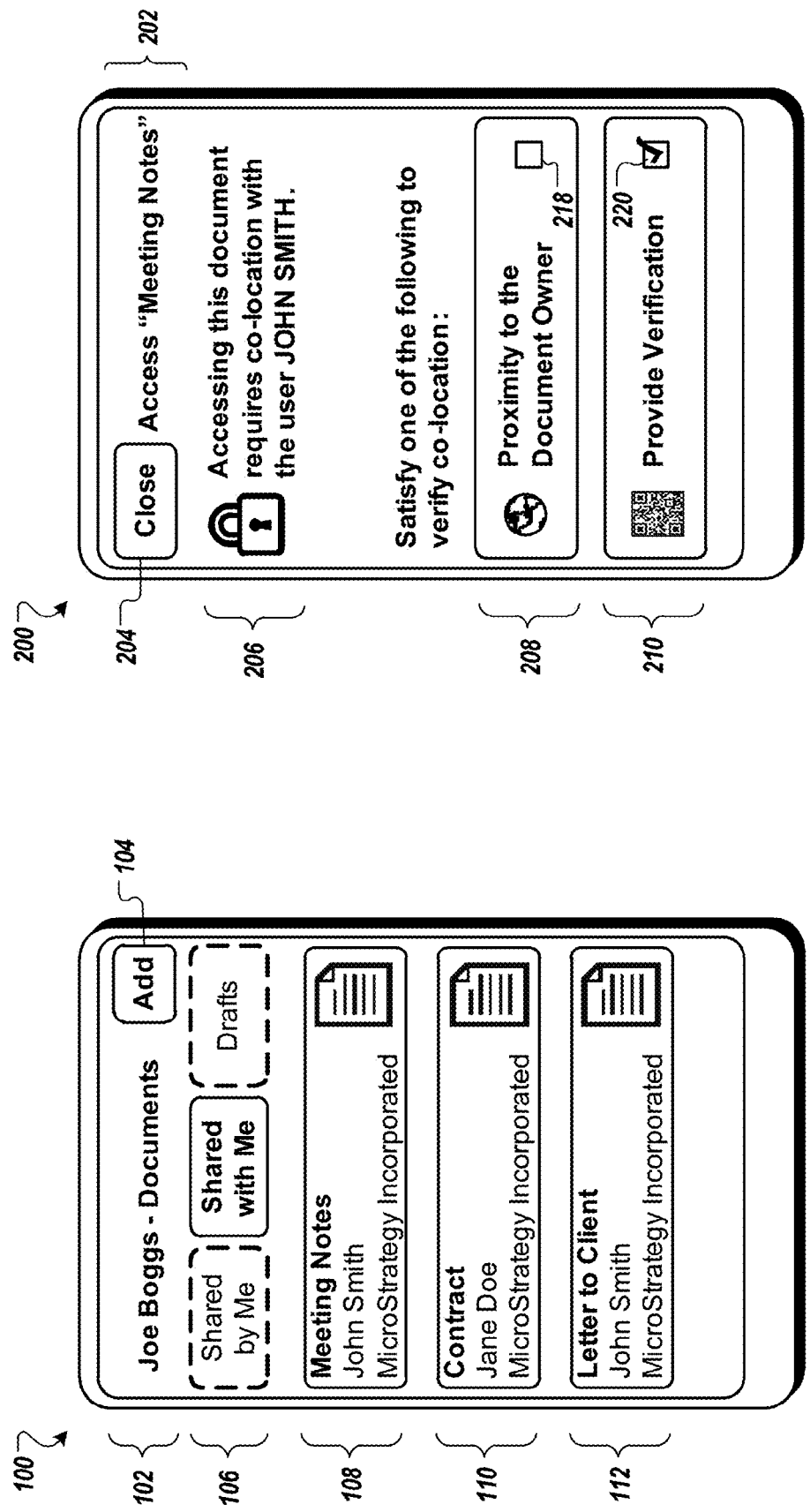

| Content Identifier | Content Type | Creating User | Shared Users | Shared User Permitted Operations | Conditions on Performing Operations |
|---|---|---|---|---|---|
| Content #: 123 "Meeting Notes" | Spreadsheet | John Smith | Joe Boggs | View; Edit; Share | Receive Permission |
| Content #: 456 "Contract" | PDF | Jane Doe | Joe Boggs | View | Receive Permission |
| Content #: 789 "Letter to Client" | Document | John Smith | Joe Boggs | View; Electronically Sign | Receive Permission, Before December 31, 2013; in USA |

FIG. 9

CONTENT SHARING TECHNOLOGY

CROSS-REFERENCE TO RELATED APPLICATION

This application claims priority from U.S. Provisional Application No. 61/790,914, filed Mar. 15, 2013, and titled "Content Sharing," which is incorporated by reference.

TECHNICAL FIELD

This disclosure relates to sharing content.

BACKGROUND

A user may be associated with content and may be capable of performing various operations relating to the content such as accessing the content, editing the content, and/or sharing the content with other users.

DESCRIPTION OF DRAWINGS

FIGS. 1-4 illustrate example user interfaces that enable users to share and perform operations relating to content;

FIG. 9 is a representation of an example implementation of a data structure.

DETAILED DESCRIPTION

Figure 3B:
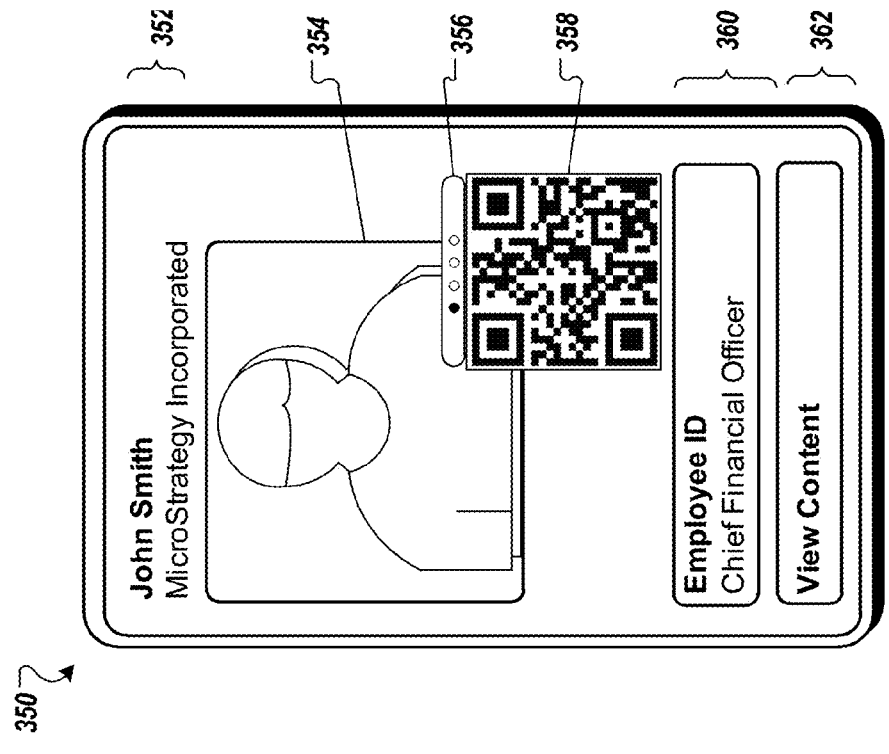

Content may be created by users and may be stored at a computing system. Thereafter, users may be able to access the content and to perform operations relating to the content. Such operations may include, for example, viewing the content, editing the content, electronically signing the content, copying the content, or saving the content locally to a user's device. In some instances, particular content may be sharable content. A user associated with the particular content may request to share the particular content with another user, and the computing system may enable the content to the shared with the other user, for example, by also associating the particular content with the other user.

Techniques are described that enable a user to share content with another user, for example, such that the user with whom the content is shared may perform operations relating to the content. When a user shares content with another user, one or more conditions may be applied to the shared content such that the user with whom the content is shared only may perform operations relating to the shared content when the one or more conditions are satisfied. Although examples described herein reference documents for ease of explanation, the systems and methods described are applicable to any number of forms of content, including document content, spreadsheet content, image content, video content, audio content, read-only document content, web page content, etc.

In some instances, the operations described herein may be performed by a user with a client device, such as a mobile computing device, where the user may access an application executing on the client device to share, access, and/or perform other operations relating to documents. Such an application may further be used to manage access to particular documents, as well as to manage user credentials that allow a user having a credential to access or perform other operations relating to documents. FIGS. 1-4 illustrate example interfaces pertaining to such an implementation, where users may perform the described operations by accessing the application running on the client device.

FIG. 1 illustrates an example of a user interface that includes a menu 100 of documents associated with a user. The documents may include one or more documents that have been shared with the user by one or more other users, one or more documents that the user has shared with other users, and/or one or more draft documents, for example, as shown by the options 106 illustrated in menu 100. Each of the documents may be associated with one or more conditions that limit the performing of operations relating to the documents, where the conditions may have been established by another user that shared the document with the user, by the user at the time of drafting the document, or by another user or entity at a time when the document was created or shared. As illustrated in menu 100, the option "Shared with Me" is selected. Consequently, documents that have been shared with the user by other users are displayed in menu 100. In particular, the menu 100 includes document 108 "Meeting Notes" shared with the user by another user "John Smith" of "MicroStrategy Incorporated," document 110 "Contract" shared with the user by another user "Jane Doe" of "MicroStrategy Incorporated," and document 112 "Letter to Client" shared with the user by another user "John Smith" of "MicroStrategy Incorporated." The documents 108, 110, and 112 may have conditions that limit the user's ability to open, edit, and share the documents 108, 110, and 112. The conditions may have been placed on the documents 108, 110, and 112 by the other users that shared the documents 108, 110, and 112 with the user. For instance, the document 112 may have a condition that the user may view the document without restriction, but, to share the document 112, the user needs permission from the other user "John Smith" or permission from another user holding a credential of the same type as the other user "John Smith".

In order to access or otherwise perform an operation relating to a document, the user may select the document from menu 100, where selecting the document may include touching a corresponding area on a presence-sensitive display of the client device, or any other selection method. For example, user selection of document 108 may cause an interface similar to the interface 200 illustrated in FIG. 2 to be displayed.

FIG. 2 illustrates an example interface 200 that requires the user to satisfy one or more conditions associated with document 108 before the user is allowed to access or otherwise perform operations relating to the document 108. The interface 200 may include a caption 202 identifying the interface, for example, by identifying the interface 200 as an interface to "Access 'Meeting Notes'." The interface 200 may also include a message 206 indicating that the user must satisfy one or more conditions before the user will be granted access to the document "Meeting Notes" 108. For example, the message 206 may recite "Accessing this document requires permission from the user JOHN SMITH."

The interface 200 may provide one or more options for satisfying the condition placed on accessing the document "Meeting Notes." For example, the one or more options may include an option 208 to demonstrate permission by proving "Proximity to the Document Owner," and an option 210 to demonstrate permission by providing a verification mechanism for the user "John Smith." Satisfying either of the two options may satisfy the requirement of permission from the user "John Smith." The interface 200 may also include methods for selecting one of the options, such as a checkbox 218, 220 associated with each of the one or more options 208, 210. User selection of one of the options 208, 210 may enable the user to satisfy a particular requirement relating to performing operations on the document, for example, by providing a method of demonstrating permission by providing co-location to the user "John Smith" or demonstrating permission by providing information unique to "John Smith." Selecting option 210, for example, may provide the user with the interface shown in FIG. 3A, where the user may use the interface in FIG. 3A in providing a verification mechanism that demonstrates that the particular user has permission from the user "John Smith." Interface 200 may also include an option to close 204 the current interface, allowing a user to exit the interface 200 that is displaying the various conditions associated with performing operations relating to the document.

Figure 3A:
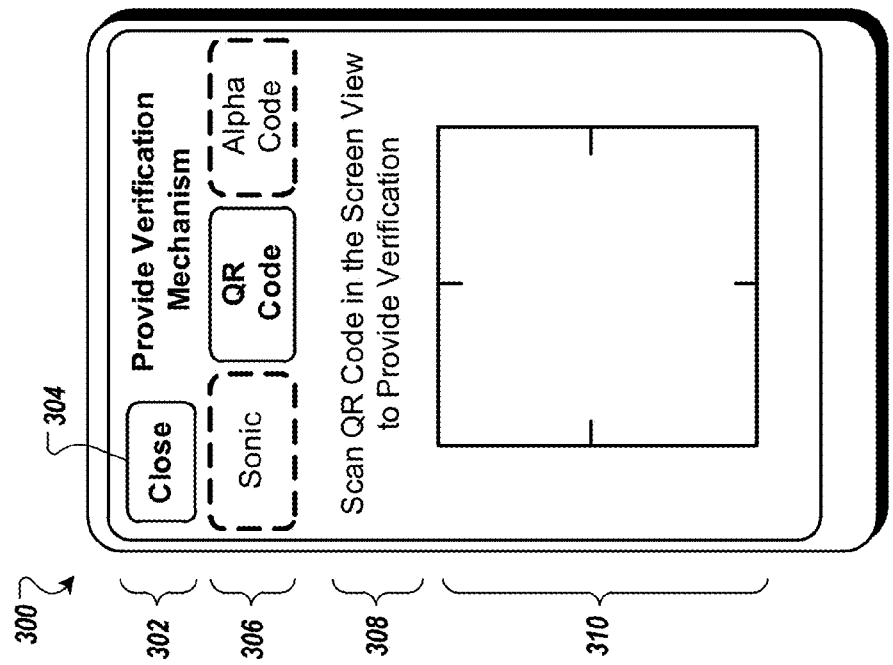

FIG. 3A shows an example of a user interface 300 that enables the user to satisfy the condition associated with performing an operation related to the document. For example, user interface 300 may be presented to a user based on the user selecting an option 210 to provide verification to perform the operation of accessing the document called "Meeting Notes." User interface 300 may include a title 302 identifying the user interface, for example, the title "Provide Verification Mechanism" shown in FIG. 3A. As shown in user interface 300, a user may be able to input a verification mechanism using one of a variety of formats, as shown by options 306, where the options may be one of an ultrasonic sound code, a quick response (QR) code, and/or an alphanumeric code. In practice, other formats may be used for providing verification of permission. For example, the verification mechanism may be any other encoded signal, such as a near field communication (NFC) signal or a communication signal that uses the Bluetooth standard, may be a barcode that encodes an alphanumeric code used for verification, or may be any other acceptable verification mechanism, In some implementations, a verification mechanism may identify a particular user, may be associated with a particular document, or may be a unique code generated by the system for the purpose of enforcing conditions on the performing of operations relating to the document. For example, the document may be associated with a condition that requires a particular user to provide permission to access the document, and the verification mechanism provided may be a user identifier pertaining to the particular user. For the example user interface shown in FIG. 3A, a user has selected an option to provide a quick response (QR) code to access the document "Meeting Notes." Based on the selected option, user interface 300 may provide instructions 308 relating to providing the verification mechanism. For example, the user interface 300 displays the instructions, "Scan QR Code in the Screen View to Provide Verification." The user interface 300 may provide an entry field 310 where a user can provide the verification mechanism related to accessing the document. As shown in FIG. 3A, the entry field 310 may be a screen view entry field, where a user may scan a quick response (QR) code to access the document, for example, by using a camera affixed to a client device associated with the user. The user interface 300 may also include an option to close 304, where selecting the option 304 may exit the current user interface and may, for example, return the user to another interface such as interface 200.

FIG. 3B shows an example of a verification mechanism that may be provided by a user to enable another user to demonstrate permission of the user and thus to perform an operation relating to a document. For example, based on a user being presented the interface 300 to "Scan QR code in the Screen View to Provide Verification," the user may scan the QR code displayed in the interface 350 of the user "John Smith" to demonstrate that the user has permission from the user "John Smith" and thus should be able to access the document. The interface 350 may be displayed on a client device associated with the user "John Smith," and may include a title 352 indicating that the client device is associated with the user "John Smith" of "MicroStrategy Incorporated." The interface 350 may further include an image 354 of the user, as well as an identifier 360 of the user that indicates the user's position in the company (e.g., "Chief Financial Officer") and an employee identification number associated with the user. The interface 350 may further include an option 362 for viewing documents. The interface presents a verification mechanism 358, in this instance shown as a computer-readable quick response (QR) code, that may be provided to another client device to verify that the other user has permission from the user "John Smith." For example, based on the user "Joe Boggs" being provided an interface 300 requesting to "Provide Verification Mechanism," the user "Joe Boggs" may scan the QR code presented at interface 350 of the user "John Smith," and the system may determine that the provided verification mechanism proves that the user "Joe Boggs" is co-located with the user "John Smith." Because the QR code is unique to the user "John Smith" and displayed by a client device of the user "John Smith," the QR code demonstrates that the user "Joe Boggs" has gained permission of the user "John Smith" to access the document in the presence of the user "John Smith."

The interface 350 further includes a slider 356 that enables output of different validation mechanisms at the client device. For example, the slider 356 may enable the client device to output an encoded signal to provide as a validation mechanism (e.g., an ultrasonic, NFC, Bluetooth, or other signal), an alphanumeric string, a unique image, or another suitable validation mechanism. Based on a user providing a verification mechanism such as that shown in interface 350 to a client device requesting to perform operations relating to a document, such as a client device outputting the interface 300, the system may determine that the verification mechanism validates the request from the user to perform the requested operation on the document.

Figure 4:
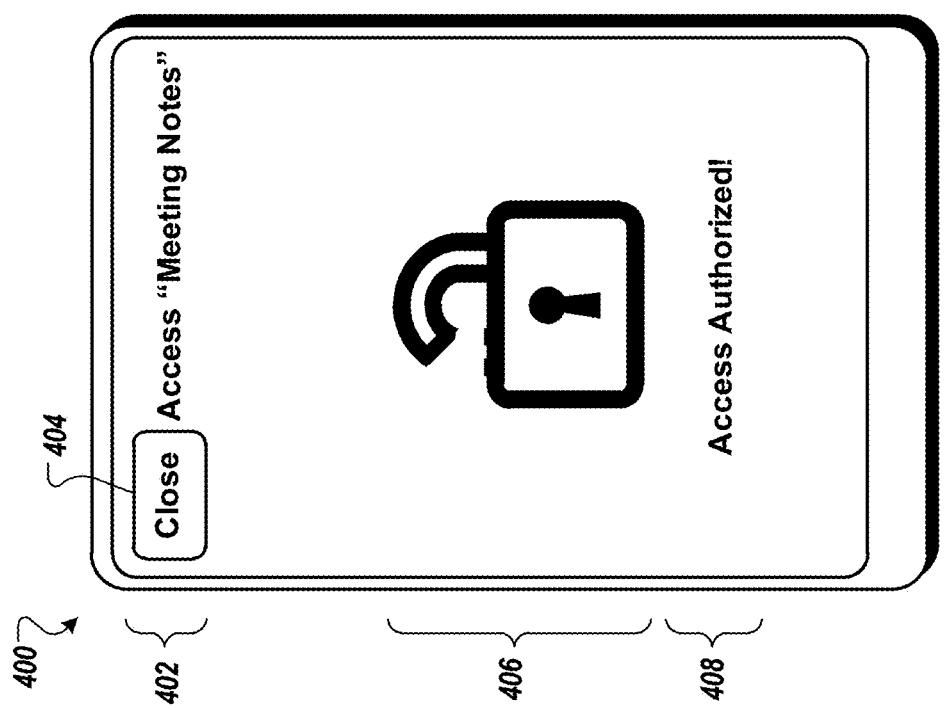

FIG. 4A provides an illustration of an example of a display on a user interface indicating that a user has been authorized to perform an operation relating to a document. Based on a user providing a valid QR code at interface 300 (e.g., the QR code that is output in interface 350), the user may be presented with a display on a user interface 400 indicating that the user has been authorized to perform the action relating to the document. For example, the display 400 may include a title 402, such as a title indicating that the display relates to accessing the document "Meeting Notes" 108. Display 400 may also include an indication that performing the operation relating to the document has been authorized, such as icon 406 of an unlocked padlock, and may additionally include a message 408 indicating that performing the operation has been authorized, for example, the message "Access Authorized!" shown in FIG. 4. Additionally, the display 400 may include an option 404 to close the display. In some instances, a user may select option 404 to leave the display 400, for example, to proceed to performing the operation relating to the document or to stop the operation relating to the document. To the extent the user provides input to proceed to access the document or does not stop the process of accessing the document, the document is accessed and displayed, as shown in FIG. 4B.

FIG. 4B provides an illustration of an example of a display of a document on a user interface 450. As shown, the user interface 450 includes text representing the document "Meeting Notes." The user interface 450 also includes a close option 410 to close the document and leave the display 450.

Figure 5A:
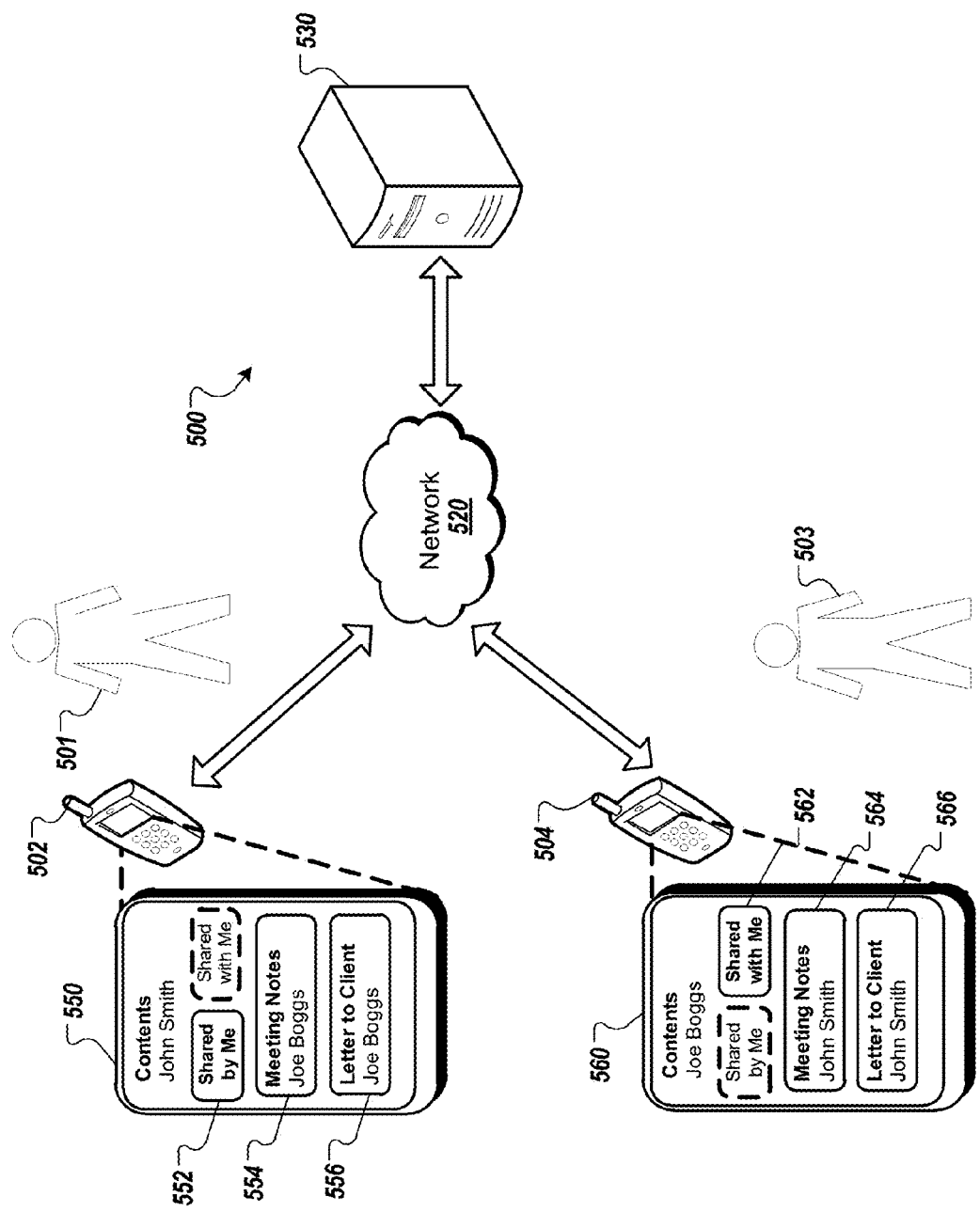
FIGS. 5A and 5B are diagrams of an example system for performing operations relating to content management.

FIG. 5A shows an example system 500 for performing operations relating to content management. As an overview, a server 530 communicates via a network 520 with client devices 502, 504 operated by users 501, 503.

The server 530 may be any suitable computer or collection of computers executing software capable of storing and managing content, conditions on the usage of content, and user credentials via a network 520 as described herein. The network 520 may be, for example, a local area network (LAN), or a wide area network (WAN), such as the Internet. As described herein, a client device such as client device 502, 504 may be any type of computing device, including, but not limited to, a mobile phone, smart phone, personal digital assistant (PDA), music player, e-book reader, tablet computer, laptop computer, desktop computer, or other stationary or portable device, that includes one or more processors and non-transitory computer-readable storage media. Software applications associated with the client devices can be written in any suitable programming language capable of performing operations assigned to the particular software applications, such as, for example, Objective-C, C++, Java, etc.

Functionally, the server 530 stores and manages content and conditions on the usage of the content. Additionally, the server 530 stores and manages credentials associated with users and uses these credentials to manage and verify the usage of specific content. The server 530 provides content to users, for example at one or more client devices 502, 504, enabling the users to perform operations on the content. In some instances, the content may be content that has been shared with a first user 503 by a second user 501 that is associated with the content, and the server 530 may provide the content to the first user based on the user being authorized to perform operations relating to the content.

Content, conditions on the usage of content, and information identifying users that own specific content and users with whom specific content has been shared can be stored in a database (e.g., MySQL, PostgreSQL, MS SQL Server, MongoDB) or other suitable data structure that can be accessed by a server 530. In some instances, the server 530 may access content, conditions associated with the content, and the other information via web services, such as representational state transfer (REST) style services.

As referred to herein, content may include any digital or non-digital content. For example, content may include any document, image, video, graphic object, portable document file (PDF), spreadsheet (e.g., Microsoft Excel spreadsheet), application, other digital file, or any other physical or digital content that may be stored, for example, using one or more servers such as server 530. Content may include a variety of associated information, such as a data type associated with the content, a date of creation of the content, a date of most recent access or editing of the content, information identifying an owner of the content, information identifying one or more users with whom the content is shared, information identifying one or more conditions on usage of the content and/or one or more restrictions associated with sharing the content with other users, information identifying one or more permissible operations relating to the content, or any other information. Additionally, as described herein, performing an operation relating to a document may include any of accessing or opening the document, editing the document, sharing the document with other users, electronically signing the document, viewing the document, sending the document, for example in an email or other message, or any other operation.

While the following description is directed at the management of document content as an example implementation, the systems and methods described herein may be used in the management of any other content types, as described previously.

In some implementations, the server 530 may receive and/or create documents. In some instances, documents may be received at the server 530 from one or more client devices 502, 504 where, for example, a user 501, 503 may upload one or more documents to the server using the client device 502, 504. The server 530 also may receive documents through other methods, such as by receiving documents that are locally uploaded to the server or by receiving documents through a web interface via network 520. For example, the server 530 may be a remotely accessible server such as a server associated with a cloud computing service, where documents may be provided to the server through a network 520. Additionally or alternatively, the server 530 may receive or create documents based on input received from client devices 502, 504.

The server 530 may present a suitable interface for the receiving and/or creation of documents, where applicable. For example, the server 530 may present a web interface through which a user can provide and/or create documents through a web browser. In some implementations, the server 530 may be directly accessible via a graphical-user interface or an application running on a device, such as a client device 502, 504. Any suitable interface can be used that enables the creation and storage of documents. In some instances, one or more documents may be created by a particular user, such as a user "John Smith" or "Jane Doe" as shown in FIG. 1. Additionally or alternatively, documents can be created at the request of a user through a web-based or other interface, or through any suitable mechanism, such as sending an email or short message service (SMS) transmission, for example, to an entity responsible for maintaining server 530. In some implementations, a user may be able to create one or more documents by using an application running on a client device 502, 504.

When a user creates, stores, or uploads a document at the server 530, an association is established between the particular document and the user. In some implementations, an association may be established between a credential associated with the user and the document, where the association enables the user to continue to perform operations relating to the document, such as the ability to access, modify, or perform other operations relating to the document. Additionally, the association between the document stored at the server 530 and the user enables the user to share the particular document with other users, thereby providing the other users the capability to perform operations relating to the same document. Based on the user sharing a particular document with one or more other users, associations can be established between the one or more other users and the particular document. According to some implementations, establishing an association between the particular document and the one or more users with whom the document has been shared can include associating the particular document with credentials associated with the shared users.

A user with whom access to a particular document has been shared can subsequently request to perform operations relating to the document. In some instances, the use of the shared document can be assigned one or more conditions to be satisfied in order for the user to be allowed to perform operations relating to the document, and the system 500 may determine whether the user's request satisfies the one or more conditions. Based on the one or more conditions being satisfied, the system 500 may enable the user to perform the requested operations relating to the document. For example, based on the system 500 determining that a user's request satisfies one or more conditions, the system 500 may provide the user with the document and may enable the user to edit the document.

As described, documents that are received or created at server 530 may have one or more conditions associated with the access to or usage of the documents and/or the performance of operations related to the documents. Additionally or alternatively, documents may have one or more restrictions associated with how it can be shared with users. A user, such as a user who initially uploads, stores, or creates the document at the server 530, may specify the one or more conditions and/or restrictions associated with the content, or, alternatively, the one or more conditions and/or restrictions may be specified by another entity.

In some implementations, a condition may require that a user obtain permission from a particular user or users to perform an operation related to a document. For example, a second user 501 may share a document with a first user 503 and a condition placed on the usage of the document may require that that the first user 503 obtain permission from the second user 501 in order to perform an operation relating to the document. In some instances, obtaining permission from the second user 501 may include providing a verification mechanism, a credential identifier, or a user identifier associated with the second user 501 to a client device 504 associated with the first user 503. In some implementations, such a mechanism or identifier may be, for example, any text or visual object, signal, or other identifier that is obtained directly from the second user 501 or from a client device 502 associated with the second user 501. By requiring the first user 503 to directly obtain the permission from the second user 501 or from a client device 502 associated with the second user 501, co-location of the two users effectively may be enforced as a requirement for satisfying the particular permission.

A verification mechanism, credential identifier, or user identifier may include any of an alphanumeric code, an encoded signal, a quick response (QR) code, or another form of identification data that may be provided by a first user 503 at a client device 504 associated with the first user 503. Based on the first user 503 providing the mechanism or identifier associated with the second user 501, the system 500 may determine that the first user 503 is in the presence of the second user 501, and may authorize the first user 503 to perform an operation relating to the document. For example, the first user 503 may request to perform an operation relating to a document, and may submit the request to perform the operation as well as a verification mechanism, credential identifier, or user identifier associated with the second user 501 at a client device 504 associated with the first user 503. The request to perform the operation relating to the document and the identification data may be received by the server 530, where the system 500 may determine that the verification mechanism or credential identifier identifies the second user 501 and therefore satisfies the condition associated with performing the operation on the document by the first user 503. Based on determining that the condition is satisfied, the server 530 may authorize performance of the operation relating to the document by the first user 503. In some instances, authorizing the performance of the operation may include, for example, providing an indication to the client device 504 associated with the first user 503 and providing the document to the first user 503 so that the first user 503 may perform the operation.

In some instances, a condition may require that a user 503 with whom content has been shared obtain permission from a particular user, a user who holds a particular credential, and/or a user who has a particular position. For example, a document that contains a company's confidential financial data may have been shared with a user 503 who is an employee of the company, and usage of the document by the user 503 may be conditioned on the user 503 being in the presence of one or more individuals associated with the company's accounting department. In this example, the user 503 may demonstrate that they have permission to perform an operation on the document from another user 501 who holds a particular credential (e.g., a credential issued by the company identifying the user as a member of the company's accounting department) or who holds a particular position (e.g., accounting manager) by providing, at client device 504, a credential identifier, or user identifier held by the user 501. The credential identifier or user identifier may identify that the particular user 501 holds the necessary credential, or may identify the user 501 as holding the particular position. Alternatively, the first user 503 may provide a verification mechanism to their client device 504, where the verification mechanism may be a unique verification mechanism pertaining to the particular document or a verification mechanism output by a client device 502 associated with the second user 501 that uniquely identifies the second user 501. For example, a verification mechanism, credential identifier, or user identifier, encoded as an alphanumeric code, an encoded signal, barcode, or quick response (QR) code, may encode information relevant to the particular credential or the particular position that the user holds, and the processing system 506 may determine that the user identifier contains information that satisfies the condition or requirement demanding that the user 503 be in the presence of a user having the credential or holding the position to perform an operation relating to the content. In some implementations, the particular verification mechanism, credential identifier, or user identifier may be output at a client device associated with a user that has the particular credential or holds the position to perform the operation, and the first user 503 may obtain the verification mechanism, credential identifier, or user identifier using their own client device 504. The verification mechanism, credential identifier, or user identifier obtained at the client device 504 may then be processed by the server 530 to determine whether the condition on performing operations on the document are satisfied. Since providing the verification mechanism, credential identifier, or user identifier may involve providing a mechanism or identifier presented at a client device 502 associated with the second user 501 to a client device 504 associated with the first user 503, in some implementations, the permission requirement may further be understood as effectively requiring the first user 503 to demonstrate that they are in the presence of a second user 501 that is able to give permission for the user 503 to perform an operation relating to the document.

As described, the verification mechanism, credential identifier, or user identifier may take the form of an alphanumeric code, an encoded signal, a QR or other optical machine-readable representation, or another form.

As referred to herein, an alphanumeric code may be a sequence of numbers and/or letters, e.g., 4 to 24 characters, that is associated with a verification mechanism, credential identifier, or user identifier, such as a user 501 that shares content with another user 503. In some instances, a given numeric representation will only be valid for a certain time period. In operation, applications for generating and providing an alphanumeric code may operate on client devices 502, 504 or server 530. The server 530 may associate an alphanumeric code with a particular user 501, 503, or with particular documents, such as documents 554,556. When a user 501, 503 presents an alphanumeric code, the server 530 can validate the alphanumeric code and can indicate whether the presented alphanumeric code matches a valid alphanumeric code at the time it is presented, e.g., a valid alphanumeric code corresponding to a particular verification mechanism, credential, or user related to the usage of the document.

As referred to herein, an optical machine-readable representation may be an arrangement of graphical elements that encode alphanumeric data, where the elements are arranged so that the data can be read by an optical scanner. For example, an optical machine-readable representation may be a bar code, a quick response (QR) code, or an Aztec code, among other optical machine-readable representations. The optical machine-readable representations may encode data including or representing user identifiers, content identifiers, or any other suitable data.

A client device 502, 504 or server 530 may use any suitable technique for encoding the optical machine-readable representation. For example, a client device 502, 504 may call a function or library routine that encodes a quick response (QR) code in accordance with the quick response (QR) code International Organization for Standardization (ISR) standard, ISO/IEC 18004:2006 RSS, Information technology—Automatic identification and data capture techniques—QR Code 2005 bar code symbology specification.

When a client device 502, 504 reads an optical machine-readable representation, the client device 502, 504 or server 530 can decode the optical machine-readable representation to generate a set of alphanumeric characters that were encoded in the representation.

The client device 502, 504 and/or server 530 may use any suitable mechanism to scan and decode the optical machine-readable representation. For example, client device 502, 504 or server 530 may access a function or library routine that decodes quick response (QR) codes or other optical machine-readable representations of a validation mechanism, credential identifier, or user identifier. The server 530 can then validate the optical machine-readable representation by analyzing data corresponding to the alphanumeric characters that were encoded in the representation. In response, the server 530 may provide a response indicating whether the presented optical machine-readable representation corresponds to an acceptable mechanism or identifier for performing operations relating to the particular document.

As described herein, an encoded signal may be any signal modified to carry data. In some implementations, an encoded signal may be a sound signal, where the sound signal may be an oscillation of pressure waves transmitted through the air that are modulated to encode information. Any suitable modulation scheme can be used, such as, for example, frequency shift keying (FSK) or phase-shift keying (PSK). In some implementations, the sound signal may be in the ultrasonic frequency range, e.g., greater than about 20 kHz. In such implementations, the sound signal may be referred to as an ultrasonic signal or an ultrasonic code. In some implementations, the sound signal may be in the audible frequency range, e.g., about 20 Hz to about 20 kHz.

The signal may encode data including or representing verification mechanisms, credential identifiers, user identifiers, or any other suitable data. In addition, the signal may optionally encode other information that is linked to or otherwise associated with the document, for example, one or more conditions and/or restrictions associated with the document. The signal may be encoded using any suitable technique. For example, the signal may be a sound signal and may be encoded using a call function or library routine that encodes data into sound signals, such as the Zoosh SDK by Naratte, Inc. A client device 502, 504 can then output the sound signal from a speaker coupled to the client device for reception by another client device 502, 504, for example, as a step in demonstrating that a user has permission to perform operations relating to a particular document. Alternatively, the signal may be a near field communication (NFC) signal that may be communicated between two client devices 502, 504, or any another encoded signal, such as an encoded signal transmitted using the Bluetooth standard.

When the signal is received, a component of the system can perform operations to decode the signal to generate a set of alphanumeric characters that were encoded in the signal. For example, a client device 502, 504 may use any suitable mechanism to receive and decode the sound signal. The client device 502, 504 can then transmit the signal to the server 530, where the server 530 can then validate the alphanumeric characters encoded in the signal. The server 530 can generate and transmit a response to the client device 502, 504 indicating that the alphanumeric characters encoded in the signal correspond to a valid verification mechanism, credential identifier, or user identifier associated with the content item and, based on determining that the encoded alphanumeric characters correspond to a valid user identifier, may permit operations to be performed relating to the document.

In some implementations, a location-based condition may be associated with performing an operation relating to a document. For example, a user may be required to be located within a certain geographic location, within a certain distance of a particular geographic location, or within a certain distance of another user to be authorized to perform an operation relating to a particular document. In some implementations, determining whether a user satisfies a geographic condition may involve obtaining location information from a client device associated with a user.

A location-based condition may specify, for example, one or more locations such as commercial buildings, geographic regions, particular rooms in a building, large venues, private residences, or any other physical space where a user may be required to be located to perform an operation relating to a document. In some implementations, the location or locations may be stored as, for example, points identified by a latitude coordinate and a longitude coordinate (e.g., 38.915530, −77.220604), polygons whose boundaries are defined by a set of latitude and longitude coordinate pairs (e.g., 38.910000, −77.220000; 38.810000, −77.220000; 38.810000, −77.120000; 38.910000, −77.12000), street addresses (e.g., 100 Main Street, Washington, D.C.), etc.

To determine a current location of a client device 502, 504, the client devices 502, 504 may use global positioning system (GPS) coordinates or other geographic location methods, for example, Wi-Fi access point triangulation data, cellular network triangulation data, or IP address information, when the client devices 502, 504 have network connectivity. In some implementations, the system may require that the client device 504 associated with a requesting user 503 be connected to a particular network (e.g., a specific Wi-Fi network or cellular base station) this is associated with a geographic location or region where performing the operation relating to the content is valid. Based on receiving the location of a client device 502, 504, the system, for example the server 530, can compare the current geographic location of the device 502, 504 with any geographic conditions associated with the particular document.

In some implementations, a location may be associated with an indication of a predefined distance from the location (e.g., 1000 yards), that may be used, for example, by a client device associated with the user, to determine if the user is located at the location. In such an instance, a user may be determined to be located at the location if the geographic location of the user's client device is determined to be anywhere within the predefined distance from the location. For example, a location may be an office building, and a user may be identified as satisfying a location-based condition associated with a document based on the user's client device being identified as within a range of 1000 yards of the office building. In some instances, a location-based condition can be stored as any suitable data object such as, for example, an eXtensible Markup Language (XML) or JavaScript Object Notation (JSON) object.

In other implementations, a location-based condition may be associated with a predefined distance between two users, such as a predefined distance between a first user 503 with whom a document has been shared and a second user 501 that shared the document with the first user 503. For example, a location relating to each user may be obtained by accessing location information at a client device 502, 504 associated with each user 501, 503, and a distance between the two locations may be determined. Based on the distance between the two locations, the system 500 may determine whether the distance between the two users satisfies the location-based condition that the first user 503 be within a predetermined range (e.g., 500 yards) of the second user 501 in order to perform the operation relating to the document.

In some implementations, a condition associated with performing an operation relating to a document may be a temporal condition. A temporal condition may identify, for example, a time period or multiple time periods during which performing an operation relating to the document is permissible. The time periods may be identified using any suitable format, including, for example, a specific date or range of dates and times (e.g., from Jan. 1, 2013 at 9:00 AM to Jan. 31, 2013 at 5:00 PM), an expiration date and time (e.g., before 5:00 PM on Jan. 15, 2013), or a recurring day or days (e.g., every Monday through Friday between 9:00 AM and 5:00 PM). The time periods may be stored in any suitable format. For example, a specific date or range of dates and times may include: a pair of dates with associated times, a starting date with an associated time plus a duration, or a pair of times since epoch. An expiration date and time could be identified by a date and time or a time since epoch. A recurring day and time could be represented as days of the week (e.g., using cron format with Sunday through Saturday represented by integers 0 through 6) and times (e.g., in 12-hour format such as 9:00 AM to 5:00 PM or in 24-hour format such as 0900 to 1700). In some implementations, the temporal condition could be stored as any suitable data object, such as, for example, an XML or JSON object. Determining whether a request by a user to perform an operation relating to a document satisfies a temporal condition may involve determining a current time using an internal clock associated with a client device 502, 504. For example, based on receiving a request from a first user 503 to perform an operation relating to a document, a current time at the client device 504 associated with the first user 503 may be determined by accessing a current time as determined by an internal clock associated with the client device 504 and determining, at the client device 504, whether the current time satisfies the temporal condition. Additionally or alternatively, a time associated with a request to perform an operation on a document may be obtained by accessing a clock external to a client device 502, 504, such as a clock associated with the server 530, and determining, based on the current time and at the server 530, whether the request satisfies a temporal condition associated with the document.

Conditions associated with performing an operation relating to a document may include combinations of the aforementioned conditions. For example, performing an operation relating to a document may be associated with a condition that is a combination of a location-based and a temporal condition, a combination of a temporal condition and a condition requiring the permission of a second user, or a combination of a location-based condition and a condition requiring the permission of a second user. Furthermore, the conditions associated with performing an operation relating to a document may change depending upon other factors, such as a current location or time. For example, performing an operation relating to a document may be permissible during certain time periods at one location and at different time periods at a different location. As another example, a user may be permitted to perform certain operations relating to a document during certain time periods when the user has received permission from a particular second user, and the user may be permitted to perform certain other operations relating to the document at different time periods when the user has received permission from a different second user.

The different examples of conditions that may be required to be satisfied before the performance of operations relating to documents is enabled (e.g., location-based, temporal, or permission-based) may apply to the sharing of content by one user with another user. For example, a first user may only be allowed to share a particular document with a second user when the first user has received permission from a third user, for example, the user that shared the document with the first user. Additionally or alternatively, a user only may be permitted to share a document with another user at a particular time or within a particular range of times, or when the user is located at a particular location or within a predetermined range of a particular location. Furthermore, conditions placed on the sharing of documents with other users may include combinations of the described conditions, such as, for example, a combination of one or more temporal, location-based, or permission-based restrictions.

Once a document has been received or created and stored by the server 530 associations between the document and one or more users may be established. Such an association between a user and a document may be based, for instance, on the user having created the document, uploaded the document to the server 530, and/or based on any other action or rationale.

Associations also may be established between a document and one or more users to reflect that the document has been shared with the one or more users by another user. For example, a user associated with a document may identify one or more users with whom to share the document, and the system may establish an association between the document and the one or more users that reflects that the document has been shared with the one or more users. Associating the document with one or more particular users may include providing information relating to the document to server 530, where the information may identify the document as being associated with the one or more particular users, and may further identify the one or more particular users as users with whom the document is being shared. A document that has been stored at the server 530 may be made accessible to one or more users with whom the document is associated. In some instances, when one or more conditions have been imposed on a user's ability to perform an operation relating to a document, the document may be made accessible to the user after the conditions on the user's ability to perform operations relating to the document have been satisfied. Making the document accessible to a user may involve providing the document to a client device such as client device 502, 504 associated with a user 501, 503 using a network such as network 520.

Based on receiving a request to perform an operation relating to a particular document, the system 500 may determine whether one or more conditions relating to the document are satisfied, and may authorize performing the operation. If the request provided by the user is a request to view, transmit, edit, or otherwise modify the document, the system may enable the user to perform the operation by providing the user with the document at a client device associated with the user. In some instances, providing the document to the client device associated with the user may involve enabling the client device to access and/or perform operations relating to the document while the document is maintained on the server 530. In other instances, the server 530 may provide the content to the client device, for example, by transmitting a file containing the document through a network 520 to the client device associated with the user, and may receive and store an updated version of the document from the client device after the user has performed the operation relating to the document. In some implementations, the client device associated with the user may automatically return the updated version of the document to the server 530 for storage based on certain conditions being met to enable the system to better ensure that the user is performing operations on the document while in compliance with any conditions on the document's use. For example, a condition may specify a predetermined period of time that begins when the document is provided to the user, and, upon the period of time elapsing, the system may send the updated version of the document to the server 530 for storage. Additionally, in some instances, after the document has been provided to the requesting user the system 500 may continue to monitor whether the use of the document is in compliance with any conditions associated with the document. For example, if a document is associated with a permission-based or location-based condition, the system may continuously monitor a location of a client device associated with the requesting user and/or the location of a client device associated with the user that provided permission to the requesting user, to enable the system to determine whether the user is still in compliance with the conditions on the document while the user is performing the requested operations.

In other implementations, a client device such as client device 502, 504 associated with a user 501, 503 may receive a document that has been associated with the user and may store the document in any suitable memory for later retrieval. For example, a user may request to perform an operation relating to a particular document associated with the user, and the system 500 may determine that the request satisfies one or more conditions on usage of the document by the user. In response to determining that the request to perform an operation relating to the document is permissible, the system 500 may authorize the usage of the document by the user and may provide the document to a client device associated with the user. The client device associated with the user may store the document and may enable the user to access and/or perform operations relating to the document at a later time, in some instances based on the user satisfying the one or more conditions on the usage of the document at that later time.

According to the example illustrated in FIG. 5A, the sharing of a particular content may involve a number of processes. For example, a user 501 "John Smith" having a client device 502 may request to share particular document 554 "Meeting Notes" with another user to enable the other user to perform operations relating to the particular document 554. To share the document with another user, the user 501 "John Smith" may access an interface 550 displayed at client device 502, where the interface may enable the user 501 to select the particular document that the user 501 would like to share. For example, the user 501 may be presented with a listing 552 of documents "Shared by Me" that includes documents 554, 556 that the user has or is sharing with other users. The user 501 may select a particular document 554 "Meeting Notes" from among the listing 552 and may additionally identify one or more users with whom to share the document 554. In some instances, selecting a user with whom to share document may involve selecting the user from among a list of potential users, performing a query for a particular user on a database of potential users, or any other method that may enable the user 501 to select another user. Additionally, the user 501 may specify one or more conditions to be placed on the ability of the user(s) with whom the document is shared to perform operations relating to the shared document.

Responsive to the user 501 "John Smith" initiating a request to share the particular document 554 "Meeting Notes" with one or more users, the server 530 may share the document 554 with the one or more users, for example, user 503 "Joe Boggs." Additionally, the server 530 may associate the document 554 with the one or more conditions and/or restrictions identified by the user 501 to associate with the shared document. In some implementations, based on the user 501 being compliant with the one or more restrictions on sharing the document, data identifying the particular document 554 and the one or more users to share the document with may be transmitted through a network 520 and received at a server 530. Based on the data, the server 530 may associate the document with the user 503, for example, by modifying information associated with the document 554 stored on the server 530 to identify the user 503 as a user with whom the document is shared. Additionally, the server 530 may modify the information associated with the document 554 on the server 530 to indicate the one or more conditions associated with usage of the document by the user 503.

After the document 554 "Meetings Notes" has been shared with the user 503 "Joe Boggs" by the user "John Smith" 501, the user 503 "Joe Boggs" may be able to access and perform other operations relating to the shared document 554, for example, by using a client device 504 associated with the user. For example, the user 503 may access an interface 560 on client device 504, where the interface 560 may include a listing 562 of documents "Shared with Me" that includes one or more documents 564, 566 that have been shared with the user 503. To perform operations relating to a particular document shared with the user 503, the user may select the particular document from among the one or more documents 564, 566, such as the document 564 "Meeting Notes."

Figure 5B:
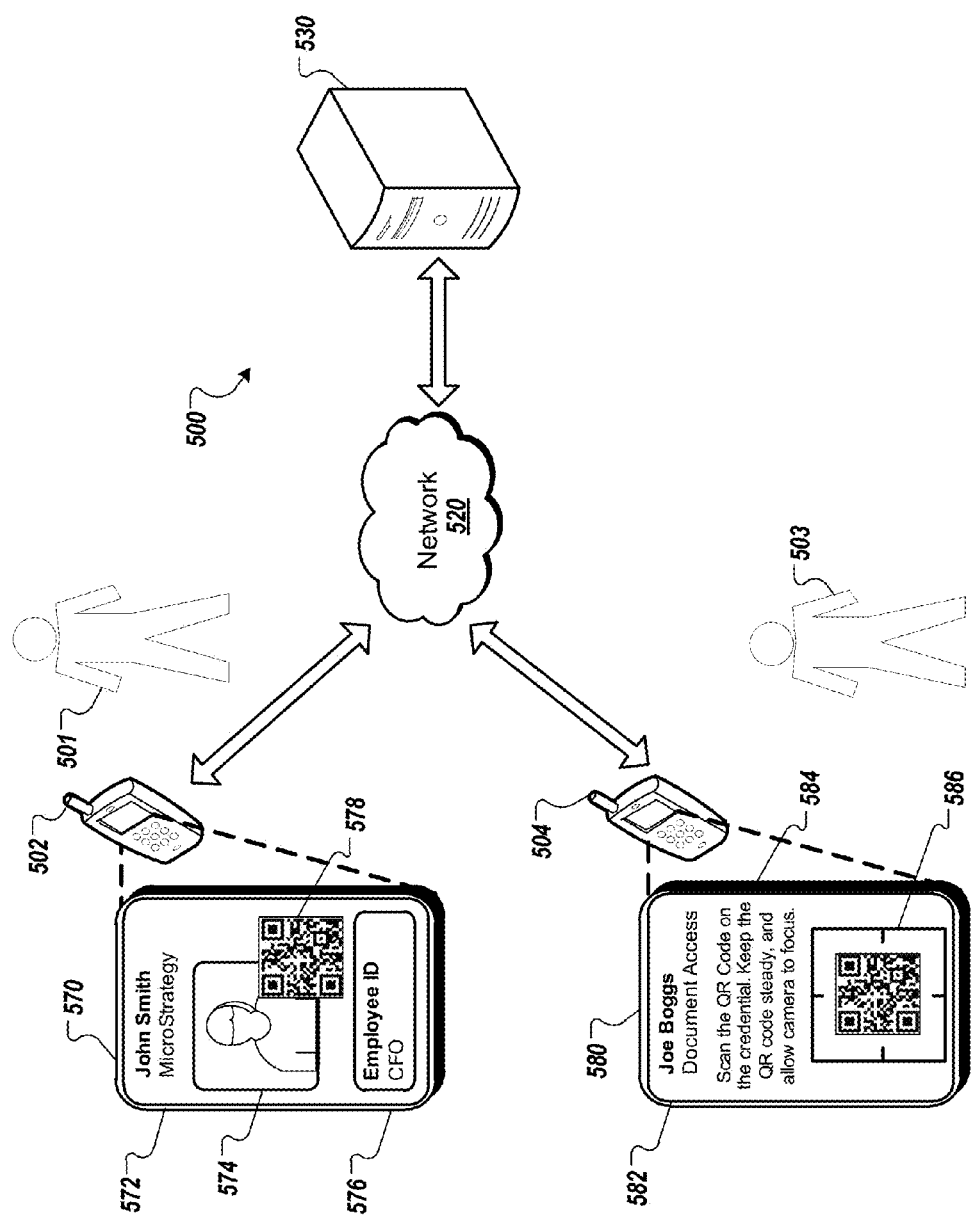

FIG. 5B illustrates an example in which a user 503 with whom a particular document has been shared attempts to access the document using a client device. For example, responsive to user 503 "Joe Boggs" selecting an option 564 for "Meeting Notes," in the interface 560 of the client device 504 shown in FIG. 5A, client device 504 may present the user with an interface 580 that enables the user 503 to perform an operation such as accessing the shared document.

However, before the user 503 is permitted to access the shared document (or otherwise perform an operation relating to the shared document), the server 530 may determine that the shared document is associated with one or more conditions, such as, for example, a location-based, permission-based, or temporal condition. For example, as illustrated in FIG. 5B, the server 530 may determine that the document "Meeting Notes" is associated with a permission-based condition that requires the user 503 to receive permission from a particular user or users prior to being able to perform operations relating to the particular document. As shown in the interface 580 of the client device 504 associated with the user 503, obtaining permission to access the document "Meeting Notes" may involve obtaining a verification mechanism, credential identifier, or user identifier of a user that can provide the user 503 with permission to perform the particular actions. As described previously, such a mechanism or identifier may include a QR code, where obtaining permission from the user may involve scanning the QR code using a client device 504 associated with the user 503. In practice, any number of other formats may be used for verification mechanisms, credential identifiers, or user identifiers, including an alphanumeric code, an encoded signal, such as an encoded ultrasonic signal, a Bluetooth signal, a near field communication (NFC), or any number of other formats.

As shown in FIG. 5B, a user 501 "John Smith" may be capable of providing the user 503 "Joe Boggs" with permission to access the document "Meeting Notes." To satisfy the permission-based condition associated with the document "Meeting Notes," "Joe Boggs" may scan a QR code displayed at the client device 502 associated with the user 501. For example, the client device 502 associated with the user 501 may display the interface 570 that includes a title 572 identifying the user 501, a picture of the user 501, employee information 576 of the user 501, and a QR code 578 that encodes information relating to a validation mechanism, an identifier for a credential associated with the user 501, and/or an identifier for the user 501. The user 503 may scan the QR code 578 in accordance with the instructions 584 presented on the interface 580, for example, by using a camera associated with the client device 504 and the screen view 586. Responsive to obtaining the mechanism or identifier, the client device 504 associated with the user 503 may decode the mechanism or identifier locally at the client device 504 or may transmit the mechanism or identifier to the server 530 for decoding. The decoded mechanism or identifier may then be analyzed by the server 530 to determine whether the mechanism or identifier satisfies the permission-based condition on accessing the document "Meeting Notes" by the user 503. For example, the server 530 may determine whether the decoded mechanism or identifier corresponds to a particular user or group of users that may provide the user 503 with the permission to access the document "Meeting Notes." Responsive to determining that the decoded mechanism or identifier corresponds to a particular user or group of users that may provide the user 503 with the permission, the server 530 may enable the user 503 to access the document "Meeting Notes." As described above, the server 530 may enable the user 503 to access the document through any of a variety of different mechanisms including by enabling the user 503 to access the document stored at a server 530 or transmitting a file containing the document "Meeting Notes" to the client device 504 associated with the user 503.

Figure 6:
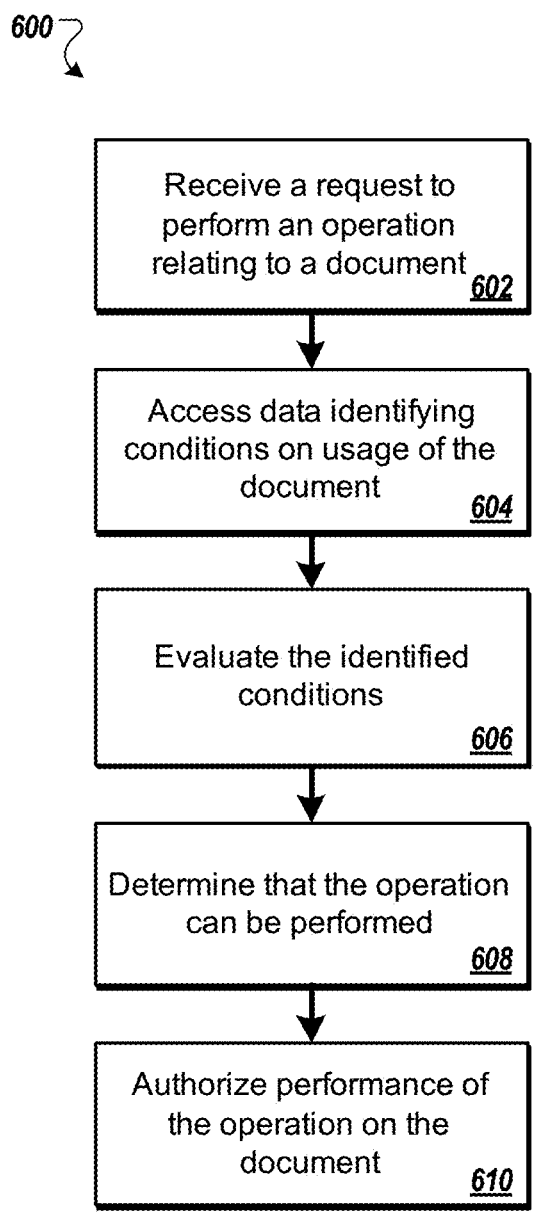
FIG. 6 is a flowchart of an example process for authorizing operations relating to content.

FIG. 6 illustrates an example process 600 for authorizing a user to perform operations relating to documents. In some instances, a document may be a document that has been uploaded or stored on the server 530 by the user, or may be a document that has been shared with the user by another user. The system receives a request to perform an operation relating to the document (602). For example, the system may store one or more documents at a server such as server 530, and may receive a request from a user using a client device to perform an operation relating to a particular document. The request to perform the operation may be received by the system 500, for example, at the server 530 through a network such as network 520. For example, at step 604, a first user 503 "Joe Boggs" may request to perform an operation relating to a shared content 564 "Meeting Notes" by requesting to perform an operation relating to the content at a client device 504.

Based on receiving the request to perform an operation relating to the document, the system may access data identifying one or more conditions associated with the user performing the operation relating to the document (604). For example, the server 530 may access data associated with the particular content 564 that identifies one or more conditions on the usage of the document 564 by the user 503 "Joe Boggs." In some implementations, server 530 may access the data associated with the particular content 564 based on the server 530 receiving a request from a client device 504 associated with the user 503 "Joe Boggs" to perform an operation relating to the shared document 564 "Meeting Notes."

The system evaluates the one or more conditions placed on the usage of the document by the user (606). The server 530 may evaluate the one or more conditions identified at process step 604, where evaluating the one or more conditions includes comparing data obtained with the request to one or more conditions and determining whether the conditions are satisfied. For example, server 530 may receive, at the time of the request, any relevant geographical location data, time data, credential identifier data, user identifier data, or other data, such as from the client device 504 associated with the requesting user 503 and may compare the received data to the identified conditions to evaluate the conditions. Alternatively, the system may identify the one or more conditions on the usage of the document 564 by the user 503 and may subsequently access data relevant to the identified conditions to evaluate the conditions.

Based on evaluating the one or more conditions, the system determines that the operation can be performed on the particular document (608). For example, the server 530 may evaluate the one or more conditions and may determine that the one or more conditions are satisfied, and therefore may determine that the operation relating to the document can be performed. Referring to the example, the server 530 may determine that the user 503 "Joe Boggs" can perform an operation relating to the shared document 564 "Meeting Notes" based on one or more permission-based, location-based, or temporal conditions selected by the user 501 "John Smith" to associate with the shared document 564 being satisfied.

Based on determining that the operation relating to the document may be performed, the system may authorize the user to perform the operation on the document (610). For example, the server 530 may authorize the user 503 "Joe Boggs" to perform an operation relating to the document 564 "Meeting Notes" that has been shared with the user, where providing the authorization may enable the user 503 "Joe Boggs" to perform an operation relating to the document 564. In some instances, authorizing the user 503 to perform an operation relating to the document 564 may involve providing an indication to the server 530 identifying the user 503 as authorized to perform the operation, may involve providing a notification to the client device 504 associated with the user 503 indicating that the user is authorized to perform the operation relating to the document, or may include performing any other operations, such as providing the document to the client device 504 associated with the user 503. In some instances, providing a notification to the client device 504 associated with the user 503 may involve pushing a notification to the client device 504 associated with the user 503, or may involve providing any other notification, for example, a notification in an email or in an SMS transmission. Based on authorizing the user 503 to perform the operation relating to the document, the process 600 ends, where the user 503 may then be able to perform operations relating to the particular document 564, the operations being permissible operations identified by the user 501 "John Smith" who shared with the document 564 with the user 503 "Joe Boggs."

Figure 7:
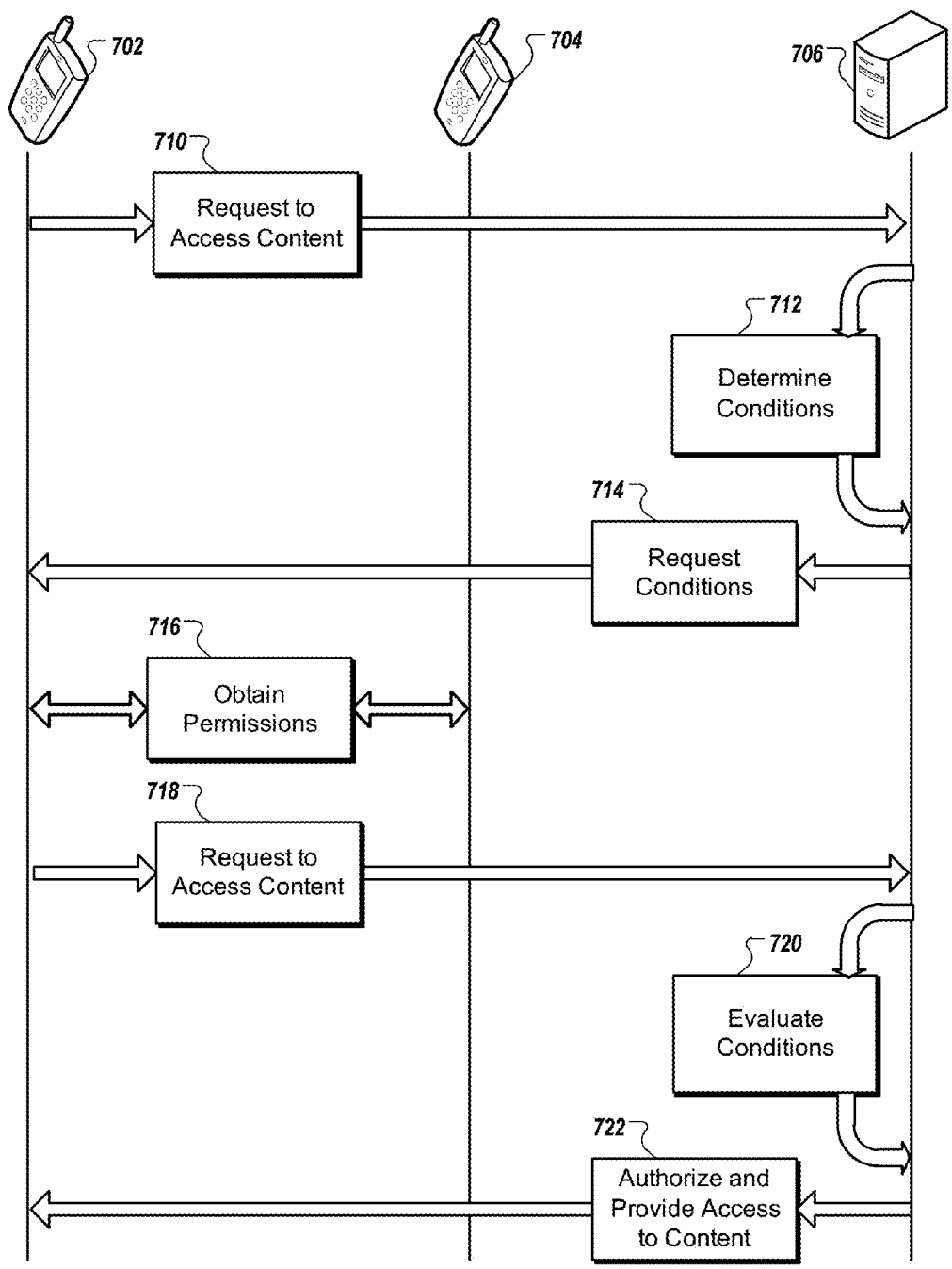
FIG. 7 is a messaging diagram that illustrates examples of messages between components of a system for sharing content and performing operations relating to shared content.

FIG. 7 provides a messaging diagram of examples of messages transmitted between various components of a system for authorizing operations relating to a document, where the document may be one that has been shared with a user by another user. Briefly, interacting components in FIG. 7 include a client device 702 associated with a first user, client device 704 associated with a second user, and a server 706. Messages communicated between various components 702-706 may enable a first user to perform operations relating to a particular document. The messages described may be transmitted via any suitable protocol, for example, using hypertext transfer protocol (HTTP) or SMS. Additionally, these example messages should not be considered limiting, as any suitable mechanism for performing the functions described could be used, and the messages could be sent or received in any suitable sequence.

Initially, server 706 receives one or more messages requesting to perform operations relating to a particular document from a client device 702 associated with a first user (710). For example, a message may be received at the server 706 requesting to access a particular document. In some instances, the message may be transmitted from client device 702 to the server 706, where the messages received at the server 706 may identify the request, the user associated with the request, as well as the document identified with the request, in addition to other information. In some instances, the particular document is a document that is stored on the server 706 and that has been shared with the first user by a second user.

The server 706 determines one or more conditions associated with the first user performing operations relating to the document identified in the request (712). In some instances, determining the one or more messages may be performed in response to receiving the request from the client device 702 to perform operations relating to the particular document.

The server 706 may send one or more messages to the client device 702 associated with the first user requesting that the first user provide information to satisfy the one or more identified conditions (714). Messages requesting that the first user satisfy the one or more conditions may be sent from the server 706 and over a network to the client device 702 associated with the first user. In response to receiving one or more messages requesting information that satisfies the one or more conditions on performing the requested operation relating to the particular document, the client device 702 or a user using the client device 702 may obtain information that potentially satisfies the one or more conditions.

In some instances, the conditions may include, for example, a condition that the first user associated with the client device 702 must obtain permission from another user associated with the particular document prior to performing the requested operation on the particular document. In such an instance, one or more messages (716) may be transmitted between client device 702 associated with the first user and a client device 704 associated with a second user that can provide the first user with permission to perform the operation relating to the particular document. For example, the client device 704 associated with the second user may transmit a validation mechanism, credential identifier, or a user identifier to the client device 702 associated with the first user as a means of providing permission to the first user 702 to perform the operation relating to the document. In some implementations, such a message may be transmitted by the client device 704 in response to receiving a request from the client device 702 for a form of permission enabling the client device 702 to perform the operation relating to the particular document.

The client device 702 associated with the first user may submit information related to satisfying the one or more conditions on performing operations relating to the particular document to the server 706 (720). For example, if the conditions included obtaining permission from a second user associated with the particular document prior to being able to perform operations relating to the document, the client device 702 may transmit, to the server 706, data associated with receiving the permission that was obtained from the client device 704 associated with the second user. Thus, the client device 702 may transmit data associated with a verification mechanism, credential identifier, or user identifier to the server 706. Additionally or alternatively, such messages 720 may include indications of a location of the user device 702, locations of a user device 702 associated with the first user and of a user device 704 associated with a second user, a current time, or any other information relevant to satisfying the one or more conditions.

Based on the message received from the client device 702 containing information relevant to the one or more conditions on the usage of the particular document by the first user associated with the client device 702, the server 706 may evaluate the one or more conditions (722). Evaluating the conditions, as described, may involve comparing the data received in messages 720 to the one or more identified conditions. Evaluating the conditions may be performed internally at the server 706, for example, by accessing information stored on one or more memory units associated with the server 706 and evaluating the conditions using one or more processors associated with the sever 706.

Figure 8:
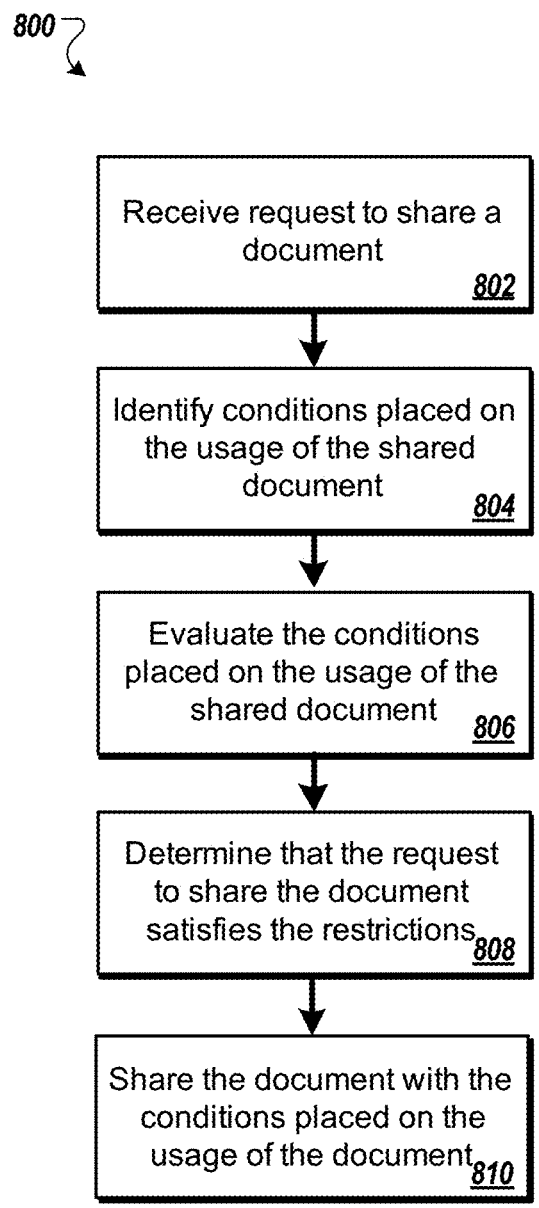
FIG. 8 is a flowchart of an example process relating to sharing content.

After evaluating the one or more conditions associated with the particular content, the server 706 may send one or more messages to the client device 702 indicating whether the performing of the operation relating to the document has been authorized (724). For example, the processing system may evaluate the one or more conditions (722), may determine that the one or more conditions are satisfied, and based on determining that the one or more conditions are satisfied may output one or more messages to client device 702. In some instances, the one or more messages may include a notification pushed to the client device 702 notifying the first user that they are authorized to perform the requested operations relating to the identified document, such as a requested operation to access the particular document. The one or more messages may also include messages to the client device 702 that may enable the client device 702 to perform the operations relating to the particular document, for example, one or more messages that may include a file containing the particular document or one or more messages that include a link that the first user can use to perform operations relating to the particular document on the server 706. FIG. 8 illustrates an example process 800 for enabling a user to share a particular document with another user. In some implementations, the steps of process 800 may be performed at a server such as a server 530. As shown, the system may receive a request to share a particular document (802). The request may be performed at a client device such as a client device 502 associated with a user 501 and may be received at a server 530. For example, a user 501 "John Smith" may request to share a particular document 554 "Meeting Notes" with another user 503 "Joe Boggs," and may submit the request at a client device 502 associated with the user 501.

Additionally, when requesting to share a particular document, a user may identify one or more conditions to associate with usage of the shared document by the user with whom the document will be shared (804). Conditions may include one or more location-based, one or more temporal conditions, or one or more permission-based conditions. In practice, the one or more identified conditions may be received at the server 530 in the same way that the server 530 may receive the request to share the particular document at process step 802. For example, the user 501 "John Smith," after requesting to share the document 554 "Meeting Notes" with another user 503 "Joe Boggs," may additionally identify one or more location-based, temporal, or permission-based conditions to apply to the usage of the document by the user 503 "Joe Boggs."

The system may evaluate the one or more conditions associated with performing operations on the document (806). For example, the server 530 may obtain information relevant to the one or more conditions identified at process step 804, and may evaluate the one or more conditions to determine if the request to share the particular document complies with the one or more conditions. Evaluating the restrictions may involve accessing geographic location data, temporal data, verification mechanism, credential, or user identifier data (e.g., an alphanumeric code, encoded signal, or quick response (QR) or other optical computer-readable code), or other information relating to the one or more conditions. In some instances, accessing such data may involve accessing the data at a client device associated with the user requesting to share the content, or may include accessing data at another location. For example, the server 530 may access geographic, temporal, verification mechanism, credential identifier, user identifier, or other data at a client device 502 associated with a user 501 "John Smith" and may use the accessed data to evaluate one or more conditions placed on the usage of the particular document 554 by the user 501. In some instances, evaluating the one or more conditions may involve comparing the accessed data to one or more conditions at the server 530. For example, the server 530 may evaluate if a geographic location of the client device 502 associated with the user 501 is within a particular region where the sharing of the content 554 is allowed, may evaluate whether a current time satisfies a condition on when the content 554 may be shared, or may determine whether a verification mechanism, credential identifier, or user identifier information corresponds to a particular mechanism or identifier that is required to demonstrate permission to share the content 554.

Based on the evaluation of the one or more conditions, the system may determine that the request to share the content satisfies the conditions (808). For instance, the server 530 may, after evaluating the one or more conditions at processing step 806 as described, determine that the request to share the particular content complies with one or more of the conditions and/or may determine that the request does not satisfy one or more of the conditions. For example, the server 530 may determine that the request provided by user 501 "John Smith" to share the particular document 554 "Meeting Notes" complies with one or more location-based, temporal, or permission-based requirements limiting how the user 501 "John Smith" can share the particular document 554.

The system may share the particular document with the particular user identified by the sharing user, and may place the one or more conditions on the usage of the document (810). The one or more conditions may be associated with the usage of the document by the particular user with whom the document has been shared. In some instances, the sharing of the particular document may be authorized based on determining that the request to share the document satisfies all of the one or more conditions on the usage of the document, where failing to comply with one or more of the conditions may restrict the document from being shared with the identified user. In practice, sharing the content with the particular user may involve modifying information associated with the particular document on a server 530. For example, the information may be modified to indicate the particular user with whom the document has been shared, may indicate one or more conditions on the usage of the document by the particular user, may indicate the user who shared the item with the particular user, or may indicate any other information. For example, upon determining that the request by the user 501 "John Smith" to share the particular document 554 "Meeting Notes" complies with all of the restrictions limiting how the document 554 can be shared, the system may share the document 554 with the user 503 "Joe Boggs." This may be achieved by modifying information associated with the document 554 "Meeting Notes" on a server 530 to indicate that the user 503 "Joe Boggs" has been shared the document, that one or more conditions apply to the usage of the document 554 by the user 503 "Joe Boggs," that the document was shared with the user 503 "Joe Boggs" by the user 501 "John Smith" and may be modified to indicate any other information. In some instances, sharing the document with the particular user may also involve providing one or more notifications to users indicating that the particular document has been shared. For example, one or more notifications may be pushed to client devices 502, 504 associated with users 501, 503 indicating that the particular document 554 has been successfully shared. Additionally or alternatively, the one or more notifications may indicate other information, such as one or more conditions on usage of the document by the user 503, or any other information.

FIG. 9 provides an illustration of an example data structure The data structure 900 stores information relating to one or more content items stored on a server such as server 530, and the server may maintain one or more data structures similar to data structure 900 for the purpose of storing information relating to the content stored on the server. While the data structure 900 is shown here as a table data structure, in practice, any number of other data structures may be used to achieve a similar result. In addition, the day structure 900 may include more information or less information than shown here, or may include different information from that illustrated.

The data structure 900 includes a first column 902 for a content identifier that uniquely identifies the particular content and a second column 904 for a content type associated with the content. In some implementations, the content identifier may be represented by a name, by an alphanumeric string, or by an identification number, and the content type may any of a number of different content types, as described previously. The data structure 900 may include a third column 906 indicating a user that created or uploaded the content item to the serve 530, and a fourth column 908 indicating one or more users with whom the particular content item has been shared. The data structure 900 includes a fifth column 910 that may indicate one or more operations that the user(s) with whom the content item has been shared may perform on the shared content item. The data structure 900 may include a sixth column 912 indicating one or more conditions on performing operations relating to the shared content item by the user(s) with whom the content item has been shared. The example data structure 900 indicates a first record 920 that references a content item named "Meeting Notes." The content item named "Meeting Notes" is identified as a spreadsheet, such as a Microsoft Excel spreadsheet file, or other spreadsheet object or file. The record 920 indicates that the content item was created or uploaded to the server 530 by the user "John Smith." The record 920 indicates that the user "John Smith" has shared the content item "Meeting Notes" with another user "Joe Boggs" and indicates that the user with whom the content item has been shared is permitted to perform various operations on the particular content item including viewing, editing, and sharing the content item "Meeting Notes" subject to any conditions imposed on the ability to perform such operations as specified in column 912 for record 920. In this case, column 912 for record 920 specifies that the user "Joe Boggs" with whom the content item has been shared must receive permission from "John Smith" before being permitted to perform any such operations.

The example data structure 900 also includes a record 922 associated with a content item named "Contract," where the content item may be a contract that is stored in a portable document format (PDF). The content may be a content item that has been created or uploaded to the server 530 by a user "Jane Doe. The content may be shared with another user "Joe Boggs," as illustrated previously with respect to FIG. 1, and the user "Joe Boggs" may be able to view the content based on the user receiving permission from the user "Jane Doe." As described, receiving permission to view the content item "Contract" may involve providing a validation mechanism, credential identifier, or user identifier associated with the user "Jane Doe," such as an alphanumeric code, encoded signal, or quick response (QR) code that identifies that the requesting user has received permission to view the PDF "Contract."

Record 924 of data structure 900 relates to a content that is a letter to a client and is a document. For example, the content related to record 924 may be a Microsoft Word document, a rich text format document, or may be a document that uses any other acceptable document format. The content item has been created or uploaded by a user "John Smith" and the record 924 indicates that the content has been shared with a user "Joe Boggs." The record 924 further indicates that the user that has been shared the content is permitted to perform operations relating to the content of viewing the content and electronically signing the content. Three conditions are placed on the usage of the content by the user "Joe Boggs," in that the user may only perform operations relating to the content up until Dec. 31, 2013, may only perform operations relating to the content when located within the United States of America, and must receive permission prior to being able to perform the operations relating to the content.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer also may include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:
1. A computer implemented method comprising:
receiving, at a computer system and from a first client device of a first user, a request from the first user to access a document file stored by the computer system, the document file being associated with a second user and the second user having shared the document file with the first user with one or more conditions on access to the document file by the first user, the one or more conditions including a permission condition indicating that the first user is allowed to access the document file based on receiving permission from the second user;

responsive to receiving the request from the first user to access the document file, accessing, at the computer system, data identifying the one or more conditions on access to the document file by the first user;

evaluating, at the computer system, whether the one or more conditions on access to the document file by the first user allow the first user to access the document file, the evaluation including analyzing whether the first user has received permission to access the document file from the second user, wherein analyzing whether the first user has received permission to access the document file from the second user comprises:

receiving, from the first client device of the first user, identification data provided to the first client device of the first user by a second client device of the second user, wherein receipt of the identification data from the first client device of the first user indicates that the first client device of the first user is proximate to the second client device of the second user, and determining whether the identification data received from the first client device of the first user indicates that the first user has received permission to access the document file from the second user;

based on results of the evaluation, determining, at the computer system, that the one or more conditions on access to the document file by the first user allow the first user to access the document file, the determination including determining, based on results of the analysis, that the first user has received permission to access the document file from the second user;

authorizing access to the document file based on the determination that the one or more conditions on access to the document file by the first user allow the first user to access the document file; and sending, to the first client device of the first user, the document file based on the authorization.

2. The method of claim 1, further comprising:

receiving, from the second client device of the second user, a request to revoke access to the document file by the first user; and based on the request to revoke access to the document file by the first user, revoking access to the document file by the first user by preventing the first user from accessing the document file.

3. The method of claim 1:

wherein accessing data identifying the one or more conditions on access to the document file by the first user comprises accessing, at the computer system, a distance condition identifying a threshold distance between the first client device of the first user and the second client device of the second user, the threshold distance defining a distance between the first client device of the first user and the second client device of the second user that is required for the first user to access the document file;

wherein evaluating whether the one or more conditions on access to the document file by the first user allow the first user to access the document file comprises:

determining, at the computer system, a first geographic location of the first client device of the first user, determining, at the computer system, a second geographic location of the second client device of the second user, determining a distance between the first client device of the first user and the second client device of the second user based on the first geographic location and the second geographic location, and comparing the distance between the first client device of the first user and the second client device of the second user to the threshold distance; and wherein determining that the one or more conditions on access to the document file by the first user allow the first user to access the document file comprises determining, at the computer system and based on results of the comparison, that the distance between the first client device of the first user and the second client device of the second user is within the threshold distance.

4. The method of claim 3, further comprising:

monitoring the distance between the first client device of the first user and the second client device of the second user with respect to the threshold distance;

based on the monitoring, determining that the distance between the first client device of the first user and the second client device of the second user has changed to exceed the threshold distance; and based on the determination that the distance between the first client device of the first user and the second client device of the second user has changed to exceed the threshold distance, revoking access to the document file by the first user.

5. The method of claim 1, wherein accessing data identifying the one or more conditions on access to the document file by the first user comprises:

accessing, at the computer system, a geographic condition identifying a geographic region at which the first user is allowed to access the document file;

wherein evaluating whether the one or more conditions on access to the document file by the first user allow the first user to access the document file comprises:

determining, at the computer system, a geographic location of the first client device of the first user, and comparing the geographic location of the first client device of the first user to the geographic region; and wherein determining that the one or more conditions on access to the document file by the first user allow the first user to access the document file comprises determining, at the computer system and based on results of the comparison, that the geographic location of the first client device of the first user is within the geographic region.

6. The method of claim 1, wherein accessing data identifying the one or more conditions on access to the document file by the first user comprises:

accessing, at the computer system, a duration condition identifying a duration of time after the first user has received permission to access the document file from the second user during which the first user is allowed to access the document file;

wherein evaluating whether the one or more conditions on access to the document file by the first user allow the first user to access the document file comprises analyzing whether the request to access the document file was received within the duration of time; and wherein determining that the one or more conditions on access to the document file by the first user allow the first user to access the document file comprises determining, at the computer system and based on results of the analysis, that the request to access the document file was received within the duration of time.

7. The method of claim 1, wherein accessing data identifying the one or more conditions on access to the document file by the first user comprises:

accessing, at the computer system, a time of day condition identifying a time period within a day during which the first user is allowed to access the document file;

wherein evaluating whether the one or more conditions on access to the document file by the first user allow the first user to access the document file comprises:

determining, at the computer system, a time of day related to when the request to access the document file was received, and comparing the determined time of day to the time period during which the first user is allowed to access the document file; and wherein determining that the one or more conditions on access to the document file by the first user allow the first user to access the document file comprises determining, at the computer system and based on results of the comparison, that the determined time of day is within the time period during which the first user is allowed to access the document file.

8. The method of claim 1, wherein the identification data comprises identification data having been extracted, by the first client device of the first user, from a short-range wireless computer-readable signal received by the first client device of the first user from the second client device of the second user, the second client device of the second user having encoded the identification data into the short-range wireless computer-readable signal.

9. The method of claim 1, wherein the identification data comprises identification data having been extracted, by the first client device of the first user, from a Quick Reference (QR) code displayed on the second client device of the second user and imaged by the first client device of the first user, the second client device of the second user having encoded the identification data into the QR code.

10. The method of claim 1:

wherein receiving the identification data provided to the first client device of the first user by the second client device of the second user comprises receiving a type of credential;

wherein determining whether the identification data received from the first client device of the first user indicates that the first user has received permission to access the document file from the second user comprises analyzing whether the type of credential matches a particular type of credential that is permitted to grant permission to access the document file; and wherein determining that the first user has received permission to access the document file from the second user comprises determining that the type of credential matches the particular type of credential.

11. The method of claim 1, wherein accessing data identifying the one or more conditions on access to the document file by the first user comprises accessing, at the computer system, a verification condition indicating that the first user is allowed to access the document file based on the second user verifying, from the second client device of the second user, that the first user has permission to access the document file;

wherein evaluating whether the one or more conditions on access to the document file by the first user allow the first user to access the document file comprises:

sending, to the second client device of the second user, a request to verify that the first user has permission to access the document file, receiving, from the second client device of the second user and in response to the request to verify that the first user has permission to access the document file, a verification message, and analyzing whether the verification message verifies that the first user has permission to access the document file; and wherein determining that the one or more conditions on access to the document file by the first user allow the first user to access the document file comprises determining, at the computer system and based on results of the analysis, that the verification message verifies that the first user has permission to access the document file.

12. The method of claim 1, further comprising:

receiving an indication that the first user has accessed the document file; and based on the indication that the first user has accessed the document file, notifying the second user that the first user has accessed the document file.

13. The method of claim 1, further comprising:

receiving a request from the first user to edit the document file;

determining that the one or more conditions on access to the document file by the first user allow the first user to edit the document file; and authorizing editing of the document file based on the determination that the one or more conditions on access to the document file by the first user allow the first user to access the document file.

14. A computer implemented method comprising:

receiving, at a computer system and from a first client device of a first user, a request from the first user to share a document file stored by the computer system, the document file being associated with a second user and the second user having shared the document file with the first user with one or more conditions on sharing of the document file by the first user, the one or more conditions including a permission condition indicating that the first user is allowed to share the document file based on receiving permission from the second user, and the request from the first user is a request to share the document file with a third user that is different than the second user;

responsive to receiving the request from the first user to share the document file, accessing, at the computer system, data identifying the one or more conditions on sharing of the document file by the first user;

evaluating, at the computer system, whether the one or more conditions on sharing of the document file by the first user allow the first user to share the document file with the third user, the evaluation including analyzing whether the first user has received permission to share the document file from the second user, wherein analyzing whether the first user has received permission to share the document file from the second user comprises:

receiving, from the first client device of the first user, identification data provided to the first client device of the first user by a second client device of the second user, wherein receipt of the identification data from the first client device of the first user indicates that the first client device of the first user is proximate to the second client device of the second user, and determining whether the identification data received from the first client device of the first user indicates that the first user has received permission to share the document file from the second user;

based on results of the evaluation, determining, at the computer system, that the one or more conditions on sharing of the document file by the first user allow the first user to share the document file, the determination including determining, based on results of the analysis, that the first user has received permission to share the document file from the second user;

authorizing sharing of the document file based on the determination that the one or more conditions on sharing of the document file by the first user allow the first user to share the document file with the third user; and sending, to a third client device of the third user, the document file based on the authorization.

15. The method of claim 14:

wherein receiving the identification data provided to the first client device of the first user by the second client device of the second user comprises receiving a type of credential;

wherein determining whether the identification data received from the first client device of the first user indicates that the first user has received permission to share the document file from the second user comprises analyzing whether the type of credential matches a particular type of credential that is permitted to grant permission to share the document file; and wherein determining that the first user has received permission to share the document file from the second user comprises determining that the type of credential matches the particular type of credential.

16. The method of claim 14, wherein accessing data identifying the one or more conditions on sharing of the document file by the first user comprises accessing, at the computer system, a verification condition indicating that the first user is allowed to share the document file based on the second user verifying, from the second client device of the second user, that the first user has permission to share the document file;

wherein evaluating whether the one or more conditions on sharing of the document file by the first user allow the first user to share the document file comprises:

sending, to the second client device of the second user, a request to verify that the first user has permission to share the document file, receiving, from the second client device of the second user and in response to the request to verify that the first user has permission to share the document file, a verification message, and analyzing whether the verification message verifies that the first user has permission to share the document file; and wherein determining that the one or more conditions on sharing of the document file by the first user allow the first user to share the document file comprises determining, at the computer system and based on results of the analysis, that the verification message verifies that the first user has permission to share the document file.

17. A system comprising:

one or more processing elements; and non-transitory computer-readable storage media storing instructions that, when executed by the one or more processing elements, cause the system to:

receiving, at a computer system and from a first client device of a first user, a request from the first user to access a document file stored by the computer system, the document file being associated with a second user and the second user having shared the document file with the first user with one or more conditions on access to the document file by the first user, the one or more conditions including a permission condition indicating that the first user is allowed to access the document file based on receiving permission from the second user;

responsive to receiving the request from the first user to access the document file, accessing, at the computer system, data identifying the one or more conditions on access to the document file by the first user;

evaluating, at the computer system, whether the one or more conditions on access to the document file by the first user allow the first user to access the document file, the evaluation including analyzing whether the first user has received permission to access the document file from the second user, wherein analyzing whether the first user has received permission to access the document file from the second user comprises:

receiving, from the first client device of the first user, identification data provided to the first client device of the first user by a second client device of the second user, wherein receipt of the identification data from the first client device of the first user indicates that the first client device of the first user is proximate to the second client device of the second user, and determining whether the identification data received from the first client device of the first user indicates that the first user has received permission to access the document file from the second user;

based on results of the evaluation, determining, at the computer system, that the one or more conditions on access to the document file by the first user allow the first user to access the document file, the determination including determining, based on results of the analysis, that the first user has received permission to access the document file from the second user;

authorizing access to the document file based on the determination that the one or more conditions on access to the document file by the first user allow the first user to access the document file; and sending, to the first client device of the first user, the document file based on the authorization.

18. A computer implemented method comprising:

receiving, at a computer system, a request from a first user to access a document file stored by the computer system, the document file being associated with a second user and the second user having shared the document file with the first user with one or more conditions on access to the document file by the first user, the one or more conditions including (i) a permission condition indicating that the first user is allowed to access the document file based on receiving permission from another user defined by the second user in setting the permission condition, and (ii) a distance condition identifying a threshold distance between a first client device associated with the first user and a second client device associated with the second user, the threshold distance defining a distance between the first client device associated with the first user and the second client device associated with the second user that is required for the first user to access the document file;

responsive to receiving the request from the first user to access the document file, accessing, at the computer system, data identifying the one or more conditions on access to the document file by the first user;

evaluating, at the computer system, whether the one or more conditions on access to the document file by the first user allow the first user to access the document file, the evaluation including:
  analyzing whether the first user has received permission to access the document file from another user defined by the permission condition,
  determining, at the computer system, a first geographic location of the first client device associated with the first user,
  determining, at the computer system, a second geographic location of the second client device associated with the second user,
  determining a distance between the first client device associated with the first user and the second client device associated with the second user based on the first geographic location and the second geographic location, and
  comparing the distance between the first client device associated with the first user and the second client device associated with the second user to the threshold distance;
based on evaluation results, determining, at the computer system, that the one or more conditions on access to the document file by the first user allow the first user to access the document file, the determination including determining, based on analysis results, (i) that the first user has received permission to access the document file from another user defined by the permission condition, and (ii) that the distance between the first client device associated with the first user and the second client device associated with the second user is within the threshold distance;
authorizing access to the document file based on the determination that the one or more conditions on access to the document file by the first user allow the first user to access the document file;
sending, to the first user, the document file based on the authorization;
monitoring the distance between the first client device associated with the first user and the second client device associated with the second user with respect to the threshold distance;
based on the monitoring, determining that the distance between the first client device associated with the first user and the second client device associated with the second user has changed to exceed the threshold distance; and
based on the determination that the distance between the first client device associated with the first user and the second client device associated with the second user has changed to exceed the threshold distance, revoking access to the document file by the first user.

19. A system comprising:
one or more processing elements; and
non-transitory computer-readable storage media storing instructions that, when executed by the one or more processing elements, cause the system to:
  receiving, at a computer system, a request from a first user to access a document file stored by the computer system, the document file being associated with a second user and the second user having shared the document file with the first user with one or more conditions on access to the document file by the first user, the one or more conditions including (i) a permission condition indicating that the first user is allowed to access the document file based on receiving permission from another user defined by the second user in setting the permission condition, and (ii) a distance condition identifying a threshold distance between a first client device associated with the first user and a second client device associated with the second user, the threshold distance defining a distance between the first client device associated with the first user and the second client device associated with the second user that is required for the first user to access the document file;
  responsive to receiving the request from the first user to access the document file, accessing, at the computer system, data identifying the one or more conditions on access to the document file by the first user;
  evaluating, at the computer system, whether the one or more conditions on access to the document file by the first user allow the first user to access the document file, the evaluation including:
    analyzing whether the first user has received permission to access the document file from another user defined by the permission condition,
    determining, at the computer system, a first geographic location of the first client device associated with the first user,
    determining, at the computer system, a second geographic location of the second client device associated with the second user,
    determining a distance between the first client device associated with the first user and the second client device associated with the second user based on the first geographic location and the second geographic location, and
    comparing the distance between the first client device associated with the first user and the second client device associated with the second user to the threshold distance;
  based on evaluation results, determining, at the computer system, that the one or more conditions on access to the document file by the first user allow the first user to access the document file, the determination including determining, based on analysis results, (i) that the first user has received permission to access the document file from another user defined by the permission condition, and (ii) that the distance between the first client device associated with the first user and the second client device associated with the second user is within the threshold distance;
  authorizing access to the document file based on the determination that the one or more conditions on access to the document file by the first user allow the first user to access the document file;
  sending, to the first user, the document file based on the authorization;
  monitoring the distance between the first client device associated with the first user and the second client device associated with the second user with respect to the threshold distance;
  based on the monitoring, determining that the distance between the first client device associated with the first user and the second client device associated with the second user has changed to exceed the threshold distance; and
  based on the determination that the distance between the first client device associated with the first user and the second client device associated with the second user has changed to exceed the threshold distance, revoking access to the document file by the first user.

20. A computer implemented method comprising:
assigning an alphanumeric code to a second user and establishing a time period during which the alphanumeric code is valid;
sending, to a second client device of the second user, the alphanumeric code;
receiving, at a computer system, a request from a first user to access a document file stored by the computer system, the document file being associated with the second user and the second user having shared the document file with the first user with one or more conditions on access to the document file by the first user, the one or more conditions including a permission condition indicating that the first user is allowed to access the document file based on receiving permission from the second user;
responsive to receiving the request from the first user to access the document file, accessing, at the computer system, data identifying the one or more conditions on access to the document file by the first user;
evaluating, at the computer system, whether the one or more conditions on access to the document file by the first user allow the first user to access the document file, the evaluation including analyzing whether the first user has received permission to access the document file from the second user, wherein analyzing whether the first user has received permission from the second user comprises:
  receiving, from a first client device of the first user, an authorization code provided to identify the second user, the authorization code having been provided to the first user by the second user,
  determining whether the authorization code matches the alphanumeric code assigned to the second user, and
  determining whether the authorization code was received within the time period during which the alphanumeric code is valid;
based on evaluation results, determining, at the computer system, that the one or more conditions on access to the document file by the first user allow the first user to access the document file, the determination including determining, based on analysis results, that the first user has received permission to access the document file from the second user, wherein determining that the first user has received permission to access the document file comprises determining that the authorization code matches the alphanumeric code assigned to the second user and was received within the time period during which the alphanumeric code is valid;
authorizing access to the document file based on the determination that the one or more conditions on access to the document file by the first user allow the first user to access the document file; and
sending, to the first user, the document file based on the authorization.

21. A system comprising:
one or more processing elements; and
non-transitory computer-readable storage media storing instructions that, when executed by the one or more processing elements, cause the system to:
  assigning an alphanumeric code to a second user and establishing a time period during which the alphanumeric code is valid;
  sending, to a second client device of the second user, the alphanumeric code;
  receiving, at a computer system, a request from a first user to access a document file stored by the computer system, the document file being associated with the second user and the second user having shared the document file with the first user with one or more conditions on access to the document file by the first user, the one or more conditions including a permission condition indicating that the first user is allowed to access the document file based on receiving permission from the second user;
  responsive to receiving the request from the first user to access the document file, accessing, at the computer system, data identifying the one or more conditions on access to the document file by the first user;
  evaluating, at the computer system, whether the one or more conditions on access to the document file by the first user allow the first user to access the document file, the evaluation including analyzing whether the first user has received permission to access the document file from the second user, wherein analyzing whether the first user has received permission from the second user comprises:
    receiving, from a first client device of the first user, an authorization code provided to identify the second user, the authorization code having been provided to the first user by the second user,
    determining whether the authorization code matches the alphanumeric code assigned to the second user, and
    determining whether the authorization code was received within the time period during which the alphanumeric code is valid;
  based on evaluation results, determining, at the computer system, that the one or more conditions on access to the document file by the first user allow the first user to access the document file, the determination including determining, based on analysis results, that the first user has received permission to access the document file from the second user, wherein determining that the first user has received permission to access the document file comprises determining that the authorization code matches the alphanumeric code assigned to the second user and was received within the time period during which the alphanumeric code is valid;
  authorizing access to the document file based on the determination that the one or more conditions on access to the document file by the first user allow the first user to access the document file; and
  sending, to the first user, the document file based on the authorization.

* * * * *